(12) United States Patent
Houser

(10) Patent No.: US 8,522,840 B2
(45) Date of Patent: Sep. 3, 2013

(54) POWER SCOOP

(71) Applicant: Jeffrey D. Houser, Marion, OH (US)

(72) Inventor: Jeffrey D. Houser, Marion, OH (US)

(73) Assignee: Houser Products, LLC, Marion, OH (US)

( * ) Notice: Subject to any disclaimer, the term of this patent is extended or adjusted under 35 U.S.C. 154(b) by 0 days.

(21) Appl. No.: 13/621,301

(22) Filed: Sep. 17, 2012

(65) Prior Publication Data

US 2013/0074976 A1    Mar. 28, 2013

Related U.S. Application Data

(60) Provisional application No. 61/540,240, filed on Sep. 28, 2011.

(51) Int. Cl.
*B65B 1/04*        (2006.01)
(52) U.S. Cl.
USPC ............... 141/358; 141/1; 141/108; 141/335; 141/344; 141/365

(58) Field of Classification Search
USPC ............. 141/1, 108, 331, 335, 344, 345, 351, 141/358, 363–366
See application file for complete search history.

(56) References Cited

U.S. PATENT DOCUMENTS 2,701,078 A * 2/1955 Bowman ..................... 141/321
2,794,457 A * 6/1957 Nicodemus .................. 141/344

* cited by examiner

*Primary Examiner* — Jason K Niesz
(74) *Attorney, Agent, or Firm* — Jerry K. Mueller, Jr.; Mueller Law, LLC

(57) ABSTRACT

Disclosed is a scoop for retaining and dispensing a powder into a bottle. The scoop is formed from a housing having generally slanted sides downwardly to a spout having a slanted opening. A handle is affixed to the housing. An actuating mechanism covers the spout-slanted opening and is formed from a generally flat slide, a hand graspable element, optionally for movement of the slide from a closed state to an open state, and a switch, also for movement of the slide from a closed state to an open state. A pair of elongate ears is carried by the spout and housing and disposed adjacent to the slanted opening for retaining the slide and permitting movement of slide.

10 Claims, 6 Drawing Sheets

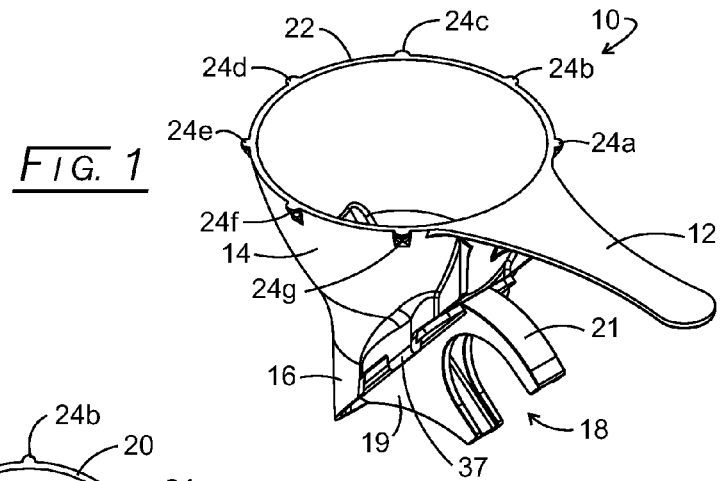
FIG. 1
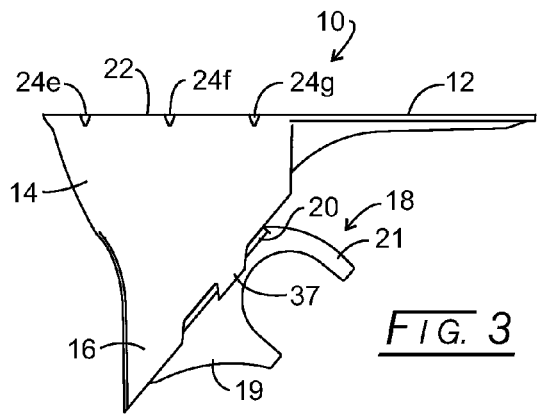
FIG. 3
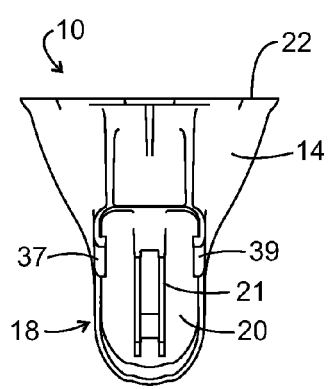
FIG. 2
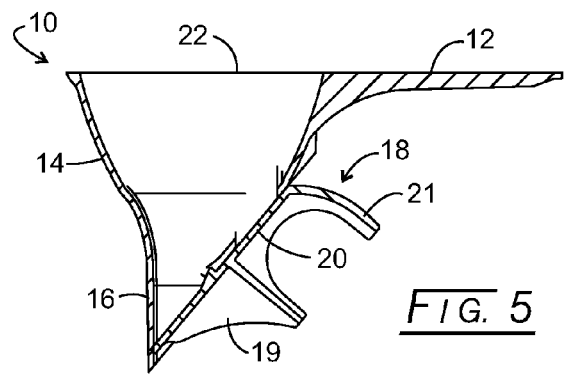
FIG. 4
FIG. 5

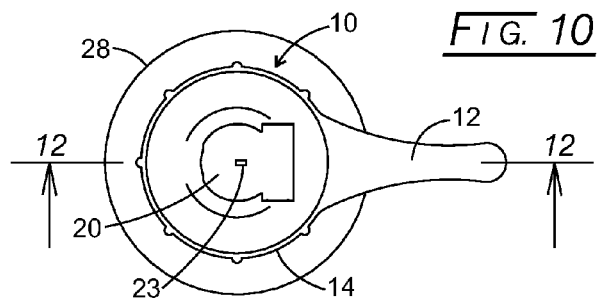
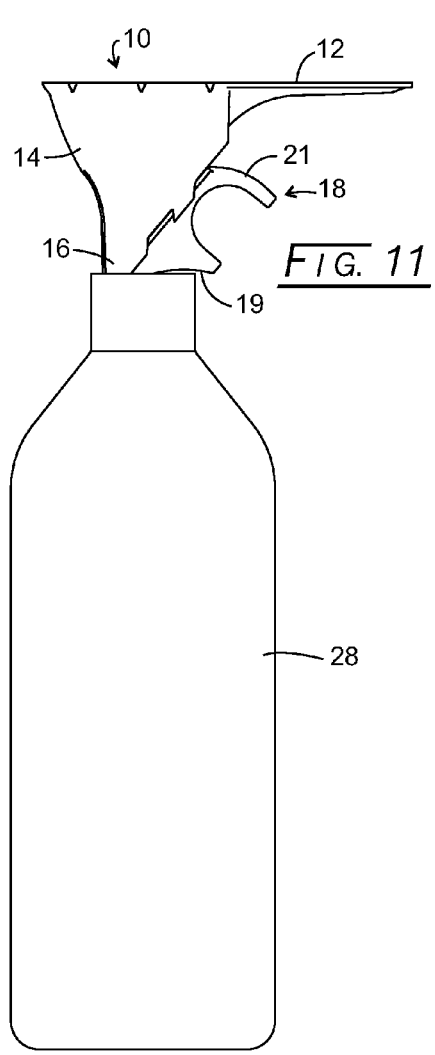
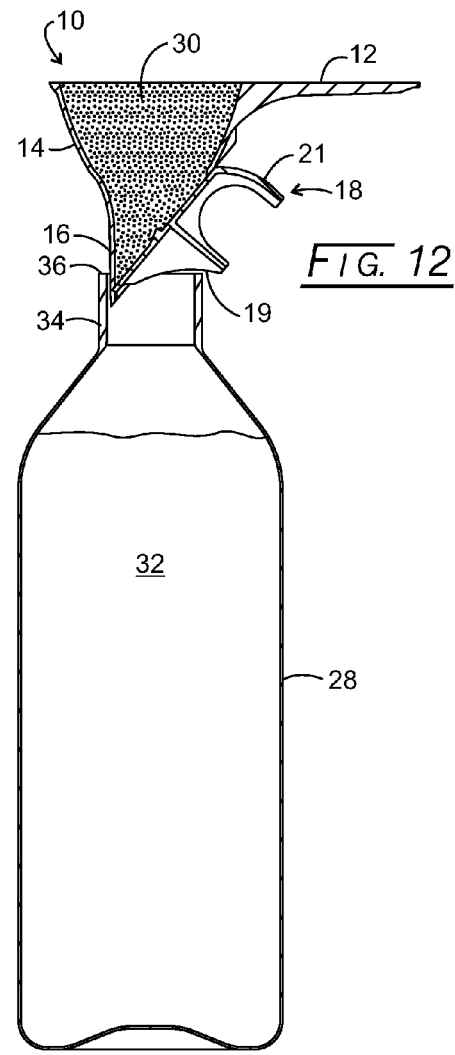

POWER SCOOP

CROSS-REFERENCE TO RELATED APPLICATIONS

This application claims benefit of U.S. provisional application Ser. No. 61/540,240 filed Sep. 28, 2011, the disclosure of which is expressly incorporated herein by reference.

STATEMENT REGARDING FEDERALLY SPONSORED RESEARCH

Not applicable.

BACKGROUND

This disclosure relates generally to powdered drinks and more particularly to a scoop for quickly transferring the powder into a drink or water bottle.

A variety of drinks come in powdered form and must be mixed with a liquid, usually water, in order for the drink to be consumed. Examples include, inter alia, fitness supplements, baby formulas, weight loss products, soups, and a variety of food and nutritional products.

Often the powder comes in a large container from which the user needs to withdraw a proper amount for the amount of liquid to be used. For example, infant formula comes in large containers and must be measured out, poured into a baby bottle, and warm water added (the water also may be in the bottle before the powder is poured in). Using the measuring device supplied by the formula manufacturer leads to much spilled powder and difficulty in transferring the powder formula into the bottle.

Users of fitness supplements often use a scoop specifically designed to measure the amount of powder required and transfer the powder into the user's drink bottle using a narrow spout that is a size to fit inside the drink bottle. Unfortunately, many (if not most) users just rest the spout against the drink bottle when transferred the powered. Since a tight seal has been created, a vacuum in the bottle often forms that prevents any powder from flowing into the bottle.

Users of fitness supplements often use a scoop specifically designed to measure the amount of powder required and transfer the powder into the user's drink bottle using a narrow spout that is a size to fit inside the drink bottle. Unfortunately, many (if not most) users just rest the spout against the drink bottle when transferring the powered. Since a tight seal has been created, a pressure in the bottle often forms and cannot escape, which prevents any powder from flowing into the bottle. The user, then, must lift off the scoop, let the air back in, to be able to finish transferring the powder into the bottle.

The disclosed power scoop eliminates the aforementioned problem and others.

BRIEF SUMMARY

Disclosed is a scoop for retaining and dispensing a powder into a bottle. The scoop is formed from a housing having generally slanted sides downwardly to a spout having a slanted opening. A handle is affixed to the housing. An actuating mechanism covers the spout-slanted opening and is formed from a generally flat slide, a hand graspable element, optionally for movement of the slide from a closed state to an open state, and a switch, also for movement of the slide from a closed state to an open state. A pair of elongate ears is carried by the spout and housing and disposed adjacent to the slanted opening for retaining the slide and permitting movement of slide.

Also disclosed is a method for dispensing powder. Such method commences with placing a powder into a scoop having (i) a housing having generally slanted sides downwardly to a spout having a slanted opening; (ii) a handle affixed to the housing; (iii) an actuating mechanism covering the spout slanted opening and formed from a generally flat slide, a hand graspable element, and a switch; (iv) a pair of elongate ears carried by the spout and housing and located adjacent to the slanted opening for retaining said actuating mechanism and permitting movement of the actuating mechanism. The next step is actuating the actuating mechanism to uncover said spout slanted opening and release said powder.

BRIEF DESCRIPTION OF THE DRAWINGS

For a fuller understanding of the nature and advantages of the present media and process, reference should be had to the following detailed description taken in connection with the accompanying drawings, in which:

FIG. 1 is an isometric view of one embodiment of the disclosed power scoop;

FIG. 2 is a top view of the power scoop of FIG. 1 in a closed position for retaining powder therein;

FIG. 3 is a side view of the power scoop of FIG. 1;

FIG. 4 is a rear view of the power scoop of FIG. 1;

FIG. 5 is a sectional view taken along line 5-5 of FIG. 2;

FIG. 10 is top view of the power scoop of FIG. 1 sitting atop a bottle containing water with the actuating mechanism is a closed or powder retaining state;

FIG. 11 is a side view of the power scoop and bottle combination of FIG. 10;

FIG. 12 is a sectional view taken along line 12-12 of FIG. 10;

DETAILED DESCRIPTION

Referring initially to the first disclosed embodiment, a power scoop or funnel, 10, is shown to include a handle, 12, an upper curvilinear annular housing, 14, and a lower spout, 16. The housing is gradated in US or metric units, or both, so that the user knows the amount of powder added to the scoop for incorporation into a bottle having a known, or relatively known, amount of liquid already in the bottle or to be added later. In order to dispense the powder from scoop 10 into a container or bottle, scoop 10 is fitted with an actuating mechanism, 18, formed from an elongate slidable member, 20, (see FIGS. 4, 5, and 16, for example) a finger graspable element, 21, and a trigger, 19. In the down or closed position depicted in FIG. 1, powder added to housing 14 stays there and does not flow out. This may be referred to a closed state of actuating mechanism 18. The top lip, 22, of housing 14 has a series of ejector pins, 24a-24g used to assist in removing housing 14 from a mold when housing 14 is being formed of plastic injection molding techniques.

Figure 8:
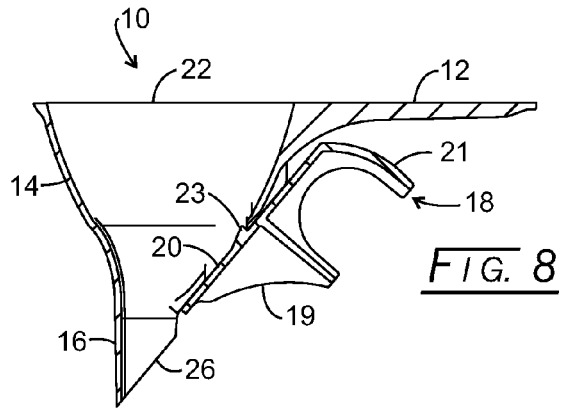
FIG. 8 is a sectional view taken along line 8-8 of FIG. 6.

FIG. 2 shows a top view of the power scoop of FIG. 1. In the side view presented in FIG. 3, slide 20 is clearly seen to be in a down or closed state over the opening in spout 16. The rear view presented in FIG. 4 again shows the same closed state of slide 20 as seen in FIG. 3. Ears, 37 and 39, retain slide 20 to hold mechanism 18 in position (see FIG. 16 also). An upstanding nib, 23, is centrally located on the inside of slide 20 (FIG. 2) and keeps slide 20 from coming back out of scoop 10. Nib 23 can be seen contacting the wall of scoop 10 in FIG. 8 not allowing slide 20 to come all the way out. The cross-sectional view in FIG. 5 again shows the components that form power scoop 10.

Figure 6:
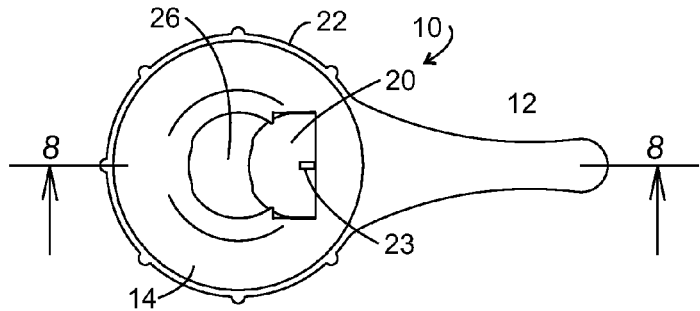
FIG. 6 is a top view of the power scoop of FIG. 1 in an open position for dispensing power housed therein.
Figure 7:
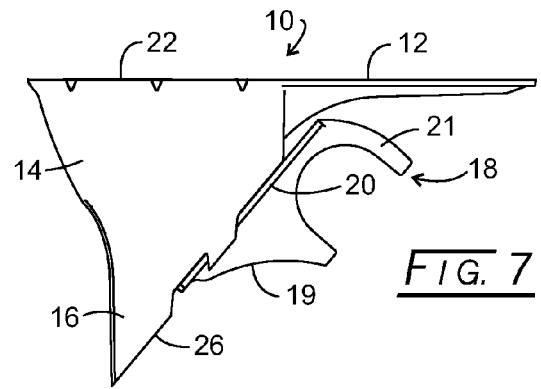
FIG. 7 is a side view of the power scoop of FIG. 6.
Figure 9:
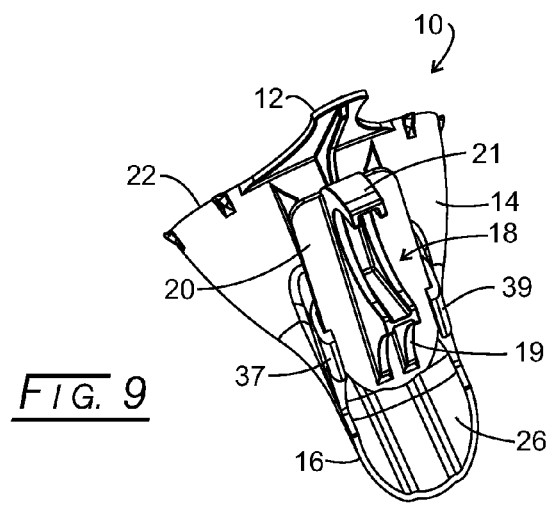
FIG. 9 is an isometric view of rear side of the power scoop of FIG. 6 showing the actuating mechanism.

The top view presented in FIG. 6 and side view presented in FIG. 7 of scoop 10 show slide 20 in an up or open position (open state), thus, uncovering an angular opening, 26, formed in spout 16 so that any powder or other contents in housing 14 can be dispensed or released from scoop 10. The sectional view of power scoop 10 in FIG. 8 likewise shows it in an active state. The isometric view in FIG. 9 shows slanted opening 26 somewhat more clearly.

Power scoop 10 has been place atop a water bottle, 28, in FIGS. 10-12. While a water bottle is shown, it just as easily could be a baby bottle or other kind of bottle, often filled with water. The cap has been removed from bottle 28 so that spout 16 fits down inside bottle 28 until trigger 19 rests on the bottle opening rim.

In FIG. 12, housing 14 is seen filled with a powder, 30, while bottle 28 is seen filled with water or a similar, most often aqueous, fluid. Spout 16 is seen to rest within neck, 34, of bottle 28 and switch 19 on the rim, 36, of neck 34. Due to the curvilinear shape of switch 19, a slight air gap is seen. Such air gap is deliberate and prevents a pressure from being formed within bottle 28 that retards powder from flowing freely thereinto. Additionally, a grove can be formed downward along the inside (or outside) of the housing and into the spout terminating at the spout opening for permitting pressure equalization inside a bottle atop which the power scoop is placed.

Figure 13:
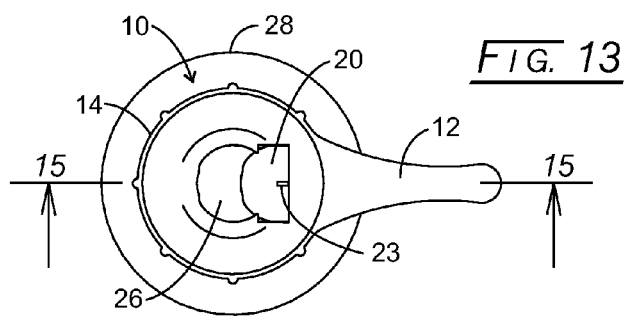
FIG. 13 is top view of the power scoop of FIG. 10 sitting atop a bottle containing water with the actuating mechanism is an open or powder dispensing state.
Figure 14:
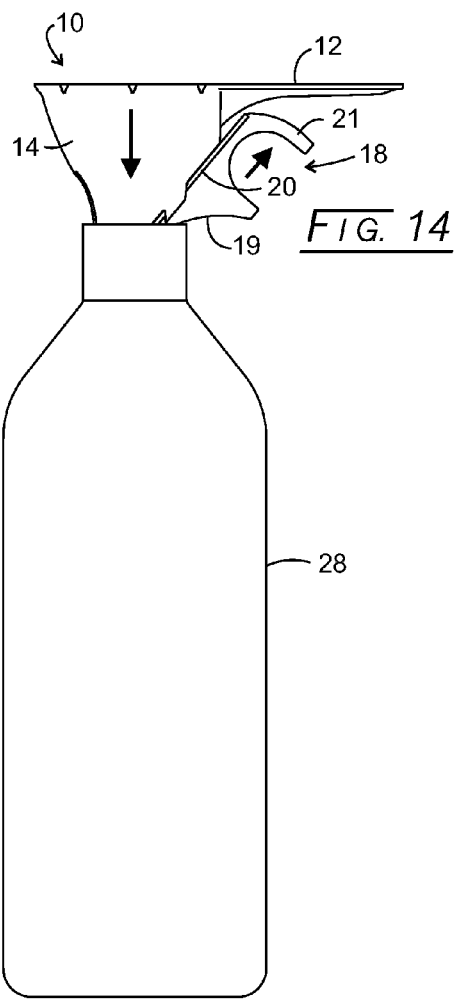
FIG. 14 is a side view of the power scoop and bottle combination of FIG. 13.
Figure 15:
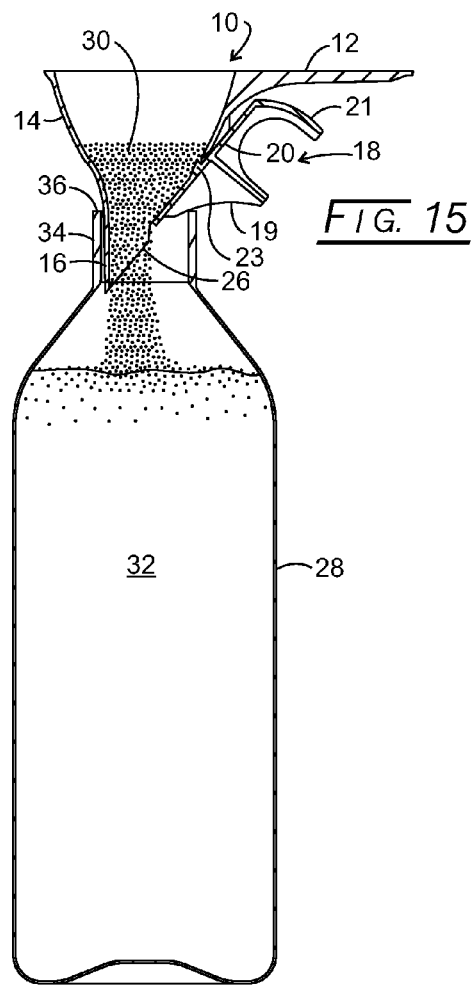
FIG. 15 is a sectional view taken along line 15-15 of FIG. 14.

FIGS. 13-15 are like FIGS. 10-12, except that actuating mechanism 18 has been moved upwardly to uncover opening 26; thus, permitting powder 30 to be released and freely flow into bottle 28 to mix with water or fluid 32. While the user need only place a finger in an arcuate finger graspable element 21 and gently pull in a upward motion to urge slide 20 to move in an angular upward direction to uncover slanted opening 26 that is formed in spout 16, switch 19 can automatically move actuating mechanism 18 for slide 20 to uncover opening 26. That is, by the user merely pushing power scoop 10 into bottle 28, bottle rim 36 pushes against switch 19 to cause actuating mechanism 18 for slide 20 to uncover opening 26. The user can rest power scoop 10 on rim 36 and the push, or the user can combine such motions into a single motion to release powder 30 into water 32.

Using either actuating technique, powder 30 flows freely and very rapidly from housing 14 into bottle 28. The slanted sides of housing 14 form an efficient funnel. By making opening 26 slanted, it has a greater area for enhancing the rapid and complete release of powder 30 into water 32.

Figure 16:
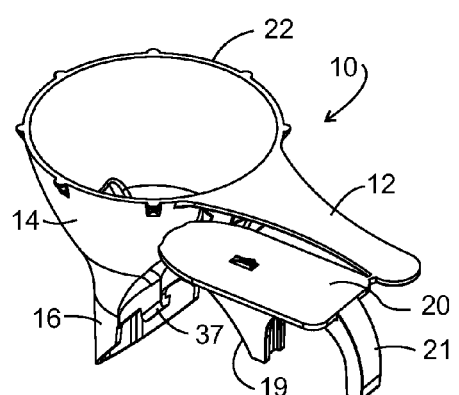
FIG. 16 is an isometric view of the power scoop of FIG. 1 with the actuating slide removed from the scoop.

Slide 20 with attached finger element 21 is revealed in greater detail in FIG. 16 with its removal from housing 14. Slide 20 is held in place by a pair of projecting ears, 37 and 39 (not seen in FIG. 16). These slightly elongate ears project slightly outwardly from opening 26 to retain slide 20 in place. FIG. 4 shows the ears also. Slide 20 has a generally planar inner surface for facilitating its movement.

Figure 17:
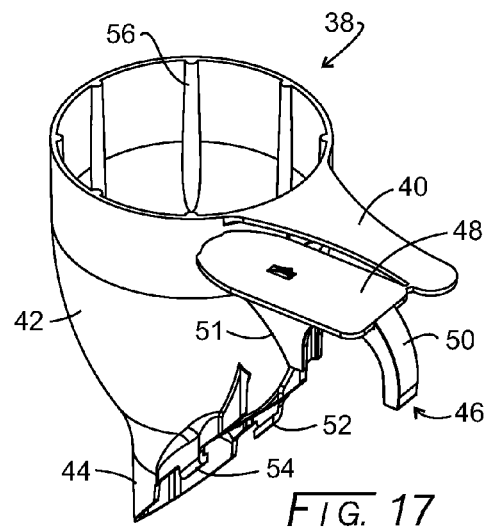
FIG. 17 is an isometric view of an alternative embodiment of the power scoop with the actuating slide removed from the scoop.

An alternative embodiment of a power scoop, 38, is seen in FIG. 17. It has a larger capacity housing, 42, to accommodate larger sized bottles that require a greater volume of powder. Power scoop 38 has a handle, 40, spout, 44, actuating mechanism, 46, formed of a slide, 48, and finger graspable element, 50. Elongate ears, 52 and 54, are more completely seen. They retain slide 48 in place and permit it to move upwardly and downwardly to cover and uncover the slanted opening in spout 44. The injector pins, representative pin 56 only being numbered are seen to be located inside housing 42 and to extend downwardly.

Figure 18:
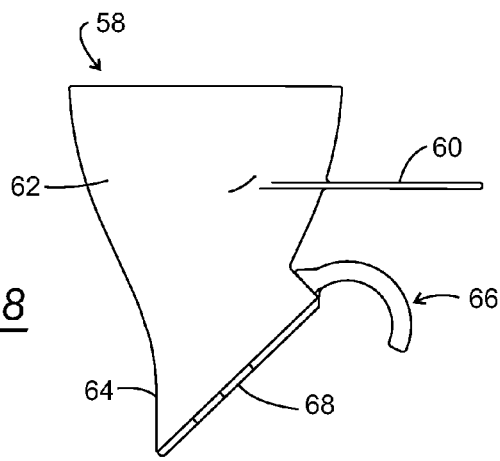
FIG. 18 is yet another power scoop embodiment.

FIG. 18 shows yet a larger capacity power scoop, 58. Its handle, 60, is located midwardly of its housing, 62. A much larger spout, 64, is required to retain the rapid and efficient dispensing of powder. A larger actuating mechanism, 66, is retained in position by extending ears, representative ear 68 only seen.

Figure 19:
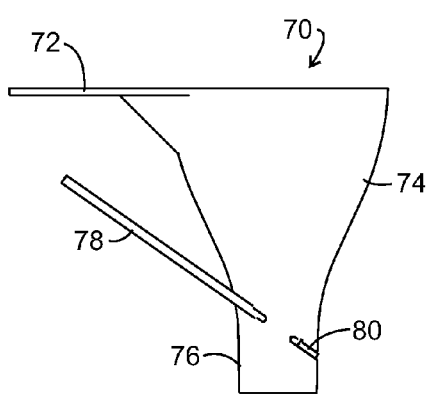
FIG. 19 is yet a further power scoop embodiment.

FIG. 19 shows yet another power scoop embodiment, 70, having a handle, 72, a housing, 74, a spout, 76, and a slide, 78. In this embodiment, an interior opening has been formed in 76 requiring a slanted opening to be formed in spout 76 to permit slide 78 to be inserted into such slanted opening. A corresponding lower slated opening at 80 permits the end of slide 78 to extend outside of spout 76 a slight distance. Movement of slide 78 uncovers the spout opening to release the contents of housing 74.

Figure 20:
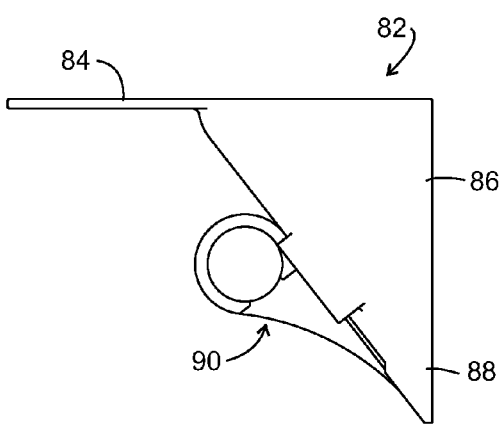
FIG. 20 is a side view of an alternative embodiment of the disclosed power scoop having a differently shaped actuating mechanism slide.

FIG. 20 shows yet a further power scoop embodiment, 82, having a handle, 84, a housing, 86, a spout, 88, and a actuating mechanism, 90. Housing 86 in this embodiment is a vertical side opposite handle 84. Also, finger graspable element, 92, is a closed loop rather than an open loop as been illustrated for the other power scoop embodiments disclosed herein; otherwise, operation of power scoop 82 is similar to that described above.

Figure 21:
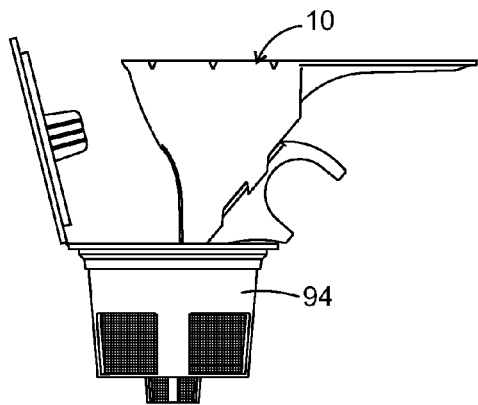
FIG. 21 is a side view of an alternative use of the disclosed power scoop for filling a reusable K-cup with coffee.
Figure 22:
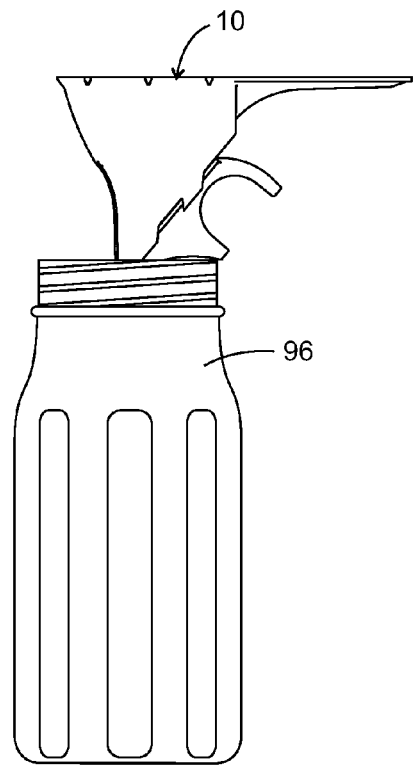
FIG. 22 is a side view of yet another use of the disclosed power scoop for filling a baby bottle with dry formula mix.
Figure 23:
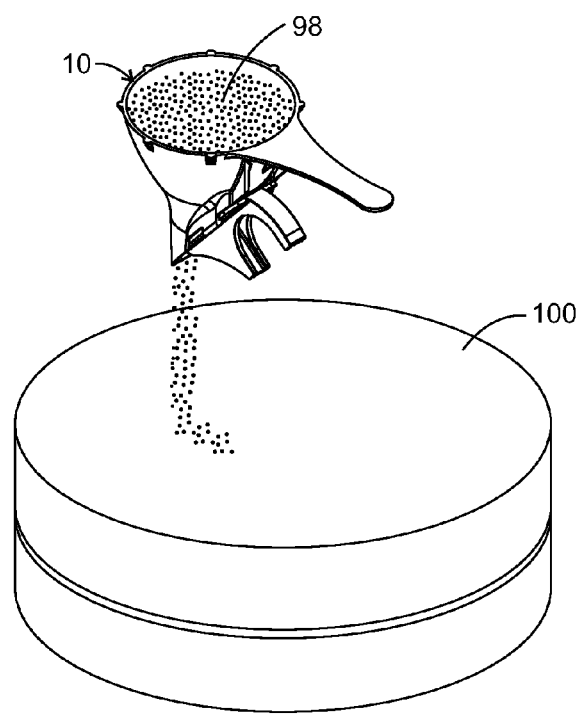
FIG. 23 is a further use of the disclosed power scoop for placing candy sprinkles atop a cake.

FIG. 21 shows power scoop 10 being used to transfer coffee into a reusable K-cup, 94. FIG. 22 shows power scoop 10 being used to transfer infant formula powder into a baby bottle, 96. FIG. 23 shows power scoop 10 being used to spread sprinkles, 98, onto the top of a cake, 100. The rate at which sprinkles 98 are dispensed can be controlled by how far slide 20 is moved upward to uncover the spout opening. Thus, the user can dispense the product at a controlled rate determined by the user.

It will be appreciated, then, that the disclosed power scoop can be used to dispense virtually any powder, granule, or like particulate into a variety of containers or onto a variety of surfaces. While the dispensed product most often will be comestible, such dispensed product can be grass seed or other non-comestible product.

Materials of construction most often will be plastics (polymers). For dispensing of comestibles, the plastic must be classified as food grade. For dispensing of other materials, the plastic must be suitable for use with such materials. Most often, the disclosed scoop should be formed from materials giving it a very smooth surface to assist the material in being dispensed quickly and completely. Of course, the disclosed scoop could be made from metal, ceramics, or other materials for special uses.

While the device has been described with reference to various embodiments, those skilled in the art will understand that various changes may be made and equivalents may be substituted for elements thereof without departing from the scope and essence of the disclosure. In addition, many modifications may be made to adapt a particular situation or material to the teachings of the disclosure without departing from the essential scope thereof. Therefore, it is intended that the disclosure not be limited to the particular embodiments disclosed, but that the disclosure will include all embodiments falling within the scope of the appended claims. In this application all units are in the metric system and all amounts and percentages are by weight, unless otherwise expressly indicated. Also, all citations referred herein are expressly incorporated herein by reference.

I claim:

1. A scoop for retaining and dispensing a powder into a bottle, which comprises:
   (a) a housing having generally slanted sides downwardly to a spout having a slanted opening;
   (b) a handle affixed to said housing;
   (c) an actuating mechanism covering said spout slanted opening and formed from a generally flat slide, a hand graspable element, and a switch;
   (d) a pair of elongate ears carried by said spout and housing and located adjacent to said slanted opening for retaining said actuating mechanism and permitting movement of said actuating mechanism;
   said spout adapted to be placed in a neck of a bottle having a rim, said neck rim pushing against said switch to move said actuating mechanism to uncover said spout slanted opening so that powder in said housing is released into said bottle.

2. The scoop of claim 1, wherein said handle extends outwardly from said housing about its top.

3. The scoop of claim 1, wherein said actuating mechanism comprises an arcuate member disposed on the outer slide surface at its top and having a switch member extending outwardly from the outer slide surface about its bottom.

4. The scoop of claim 1, wherein said generally planar inner surface carries an upstanding nib about its center for keeping said slide from coming out of the elongate ears.

5. A method for dispensing powder, which comprises the following steps:
   (a) placing a powder into a scoop, which comprises:
      (i) a housing having generally slanted sides downwardly to a spout having a slanted opening;
      (ii) a handle affixed to said housing;
      (iii) an actuating mechanism covering said spout slanted opening and formed from a generally flat slide, a hand graspable element, and a switch;
      (iv) a pair of elongate ears carried by said spout and housing and located adjacent to said slanted opening for retaining said actuating mechanism and permitting movement of said actuating mechanism;
   (b) actuating said actuating mechanism to uncover said spout slanted opening and release said powder.

6. The method of claim 5, wherein said powder is comestible.

7. The method of claim 5, wherein said actuating mechanism is actuated by said switch contacting a container into which said powder is dispensed.

8. The method of claim 5, wherein said actuating mechanism is actuated by a user using said hand graspable element.

9. The method of claim 5, wherein said powder is dispensed into a bottle.

10. The method of claim 5, wherein said powder is dispensed onto a surface.

* * * * *